United States Patent
Ikai et al.

(10) Patent No.: US 8,331,783 B2
(45) Date of Patent: Dec. 11, 2012

(54) OPTICAL COMMUNICATION SYSTEM, OPTICAL COMMUNICATION APPARATUS, AND OPTICAL COMMUNICATION METHOD THEREOF

(75) Inventors: Kazuhito Ikai, Tokyo (JP); Hiroshi Nakaishi, Tokyo (JP); Yasuhisa Kanda, Tokyo (JP); Yoshitaka Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/271,765

(22) Filed: Oct. 12, 2011

(65) Prior Publication Data

US 2012/0033974 A1   Feb. 9, 2012

Related U.S. Application Data

(62) Division of application No. 11/842,977, filed on Aug. 22, 2007, now abandoned.

(30) Foreign Application Priority Data

Aug. 25, 2006   (JP) ................................. 2006-228978

(51) Int. Cl.
 *H04J 14/02*   (2006.01)
(52) U.S. Cl. ........................................... 398/69; 398/95
(58) Field of Classification Search .................... 398/69, 398/95, 196
 See application file for complete search history.

(56) References Cited

U.S. PATENT DOCUMENTS

| | | | |
|---|---|---|---|
| 7,471,899 B2 | 12/2008 | Kim et al. | |
| 7,502,563 B2 | 3/2009 | Nozue et al. | |
| 2003/0165286 A1 | 9/2003 | Ikushima et al. | |
| 2004/0179855 A1 | 9/2004 | Harada | |
| 2005/0123300 A1 | 6/2005 | Kim et al. | |
| 2005/0213979 A1 | 9/2005 | Nakashima et al. | |
| 2008/0292317 A1* | 11/2008 | Wen et al. ........................ | 398/79 |

FOREIGN PATENT DOCUMENTS

| | | |
|---|---|---|
| JP | 3-214831 | 9/1991 |
| JP | 10254027 | 9/1998 |
| JP | 2005-277686 | 10/2005 |
| JP | 2006-197489 | 7/2006 |
| RU | 2276836 | 5/2006 |
| SU | 1688430 | 10/1991 |

OTHER PUBLICATIONS

Handley M R et al: "Comparison and simulation of wavelength allocation algorithms on passive optical networks" The Institution of Electrical Engineers, Jun. 18, 1998, pp. 8-1, XP006504052.
European Patent Office issued an European Office Action on Sep. 25, 2008, Application No. 07114812.6.

(Continued)

Primary Examiner — Leslie Pascal
(74) Attorney, Agent, or Firm — Young & Thompson

(57) ABSTRACT

An optical communication system includes a first optical communication apparatus configured to insert a wavelength control signal in a main signal to produce a modified main signal; convert the modified main signal into a first optical signal; and transmit the first optical signal, and a second optical communication apparatus configured to receive the first optical signal; extract the wavelength control signal from the received first optical signal; determine a wavelength of a second optical signal based on the extracted wavelength control signal; and transmit the second optical signal to the first optical communication apparatus.

18 Claims, 8 Drawing Sheets

OTHER PUBLICATIONS

Russian Patent Office issued a Russian Office Action on Nov. 11, 2008, Application No. 2007132180.
Korean Patent Office issued a Korean Office Action on Dec. 3, 2008, Application No. 2006-228978.

European Search Report dated Nov. 26, 2007.
Japanese Official Action—2006-228978—May 10, 2011.
Official Action issued on Sep. 13, 2011 by the Japanese Patent Office in corresponding Japanese Patent Application No. 2006-228978.

* cited by examiner

| WAVELENGTH CONTROL SIGNAL | TRANSMISSION SIGNAL WAVELENGTH |
|---|---|
| 1 | $\lambda 2$ |
| 2 | $\lambda 4$ |
| 3 | $\lambda 6$ |
| 4 | $\lambda 8$ |

FIG. 5

| RECEIVED SIGNAL WAVELENGTH | TRANSMISSION SIGNAL WAVELENGTH |
|---|---|
| $\lambda 1$ | $\lambda 2$ |
| $\lambda 3$ | $\lambda 4$ |
| $\lambda 5$ | $\lambda 6$ |
| $\lambda 7$ | $\lambda 8$ |

FIG. 7

OPTICAL COMMUNICATION SYSTEM, OPTICAL COMMUNICATION APPARATUS, AND OPTICAL COMMUNICATION METHOD THEREOF

CROSS REFERENCE TO RELATED APPLICATIONS

This application is a division of co-pending application Ser. No. 11/842,977 filed on Aug. 22, 2007, which claims foreign priority to Japanese patent application No. 2006-228978 filed on Aug. 25, 2006. The entire content of each of these applications is hereby expressly incorporated by reference.

BACKGROUND OF THE INVENTION

1. Field of the Invention

The present invention relates to an optical communication system, more particularly to an optical communication system for performing communications by multiplexing plural optical signals having mutually different wavelengths, as well as an optical communication apparatus and an optical communication method used for the optical communication system.

2. Description of the Related Art

With an increasing demand for the Internet, etc., optical communication systems with greater communication capacity are needed. In order to cope with such a demand, wavelength division multiplexing (WDM) optical communication systems are widely used. Those optical communication systems are capable of expanding the communication capacity significantly with use of one optical fiber as a transmission line. In the case of such a WDM optical communication system, plural optical transmitters are used to transmit optical signals having mutually different wavelengths therefrom. Those optical signals, each having a wavelength different from those of others, are multiplexed by a wavelength division multiplexer and then transmitted to a transmission line. As those optical transmitters, wavelength-fixed light sources in which transmission wavelengths are fixed individually can be used. In addition, by using a wavelength-tunable light source in which transmission wavelength can be changed freely, those transmission wavelengths may be controlled individually. The latter case can build a flexible system. However, the wavelength division multiplexer to which plural optical transmitters are connected can handle only input/output-enabled wavelengths determined individually by each of the connected ports. That is why it has been required conventionally to manually set a transmission wavelength of each wavelength-tunable light source connected to each port.

In order to solve the above problem, for example, a configuration as disclosed in reference document 1 (Japanese Patent Application Laid-Open Publication No. 2005-277686, particularly, FIGS. 2 and 9) is proposed. The WDM optical transmission system includes plural wavelength-variable optical transmitters, an optical multiplexer, and a return optical signal generating unit. The plural wavelength-variable optical transmitters have wavelength-tunable light sources respectively. The optical multiplexer multiplexes plural optical signals, having wavelengths which are different from each other, input from the plural transmitters respectively and thereby outputs the multiplexed optical signal. The return optical signal generating unit generates a return optical signal according to an optical signal output from the optical multiplexer, and then transmits the return optical signal to the wavelength-variable optical transmitter through the optical multiplexer.

The wavelength-variable optical transmitter includes a detector that detects the return optical signal, and a controller that controls a transmission wavelength of the optical signal transmitted from each wavelength-tunable light source based on detecting the return optical signal. The controller controls so that the transmission wavelength of the optical signal transmitted from the wavelength-tunable light source matches with the port wavelength specific to an input port of the optical multiplexer.

However, such a WDM optical transmission system has been confronted with the following problems. When a new wavelength-variable optical transmitter is installed while the system is operating, an optical signal transmitted from an operating wavelength-variable optical transmitter is output thorough an optical multiplexer. Thus the optical signal transmitted from the existing transmitter is combined with an optical signal transmitted from the new transmitter in the optical multiplexer, thereby a combined signal is output. As a result, it becomes difficult to identify the optical signal transmitted from the new transmitter and generate a return optical signal according to the optical signal. In order to solve this problem, it is required to stop the system once to set a transmission wavelength for the new transmitter as mentioned above or detect the level of each wavelength with use of a wavelength level detector or the like. If the system is stopped once, another problem will arise from the service operation. On the other hand, such a wavelength level detector is usually expensive. Therefore, if such a wavelength level detector is installed, a further problem that raises the cost will arise.

In particular, if plural wavelength-variable optical transmitters are installed simultaneously, such a system will come to be confronted with the following problems. As shown in FIG. 9 of the reference document 1, upon simultaneously installing plural wavelength-variable optical transmitters, it is assumed that any one of the transmission wavelengths will match with a target port wavelength. In this case, a light emission diode (LED) emits light that covers all the subject wavelengths as return light. Therefore, the return light is detected not only by the matching wavelength-variable optical transmitter, but also by not-matching wavelength-variable optical transmitters. As a result, it is difficult to identify a wavelength-variable optical transmitter having the transmission wavelength matching with the subject port wavelength only by detecting the presence of the return light. That is why such a judgment is done according to whether a frequency of the detected return light matches with a frequency superimposed on the transmitted optical signal. If matching, it denotes that the transmission wavelength of the subject optical transmitter matches with the target port wavelength. However, synchronous detection is required for the judgment in that case. Therefore, it requires an expensive detector not shown in FIG. 9. As a result, this causes a problem of raising cost.

Furthermore, it is assumed that the transmission wavelength of any wavelength-variable optical transmitter will not match with the target port wavelength. In this case, if an attempt is made to set a wavelength for any one of wavelength-variable optical transmitters, the wavelength setting causes a problem of influencing wavelength setting for other transmitters. More specifically, while an optical signal according to a detected return light is transmitted under wavelength setting for a wavelength-variable optical transmitter, wavelength setting for other wavelength-variable transmitters cannot be performed.

Furthermore, the WDM optical transmission system as described above causes a problem that it takes a long time until the transmission wavelength is set for each wavelength-tunable light source. More specifically, this WDM optical transmission system sets a given transmission wavelength for the subject wavelength-tunable light source, and then transmits an optical signal having the given transmission wavelength after the subject wavelength-variable optical transmitter is connected to an optical multiplexer. If receiving no return light corresponding to the optical signal of the subject transmission wavelength, the system changes the transmission wavelength to another, and then transmits the optical signal again. The system repeats this operation until the wavelength controller receives a detection signal from a photodiode.

Finally, when the wavelength controller receives a detection signal, the transmission wavelength of the wavelength-tunable light source is fixed at the set wavelength. In such a way, the system increases the necessary steps in proportion to the number of wavelengths in use. In particular, in a system that makes wavelength multiplexing many times, it takes a long time until the transmission wavelength setting is completed. And accordingly, the user is required to wait long until the user is allowed to use the system.

SUMMARY OF THE INVENTION

In view of the foregoing drawbacks of the related art methods and structures, the present invention seeks to provide an optical communication system capable of setting a wavelength of a transmission signal more easily and more efficiently, as well as an optical communication apparatus and an optical communication method used for the optical communication system, in wavelength division multiplexing optical communications technology.

An optical communication system according to the present invention includes a first optical communication apparatus configured to insert a wavelength control signal in a main signal to produce a modified main signal; convert the modified main signal into a first optical signal; and transmit the first optical signal, and a second optical communication apparatus configured to receive the first optical signal; extract the wavelength control signal from the received first optical signal; determine a wavelength of a second optical signal based on the extracted wavelength control signal; and transmit the second optical signal to the first optical communication apparatus.

An optical communication system according to the present invention includes a first optical communication apparatus configured to convert a main signal into a first optical signal; and transmit the first optical signal, and a second optical communication apparatus configured to receive the first optical signal; detect a wavelength of the received first optical signal; determine a wavelength of a second optical signal based on the detected wavelength; and transmit the second optical signal to the first optical communication apparatus.

An optical communication apparatus according to the present invention includes an optical receiving unit configured to receive a first optical signal; a wavelength control signal detecting unit configured to extract a wavelength control signal from the received first optical signal; a wavelength-tunable optical transmitting unit configured to transmit a second optical signal, changing a wavelength of the second optical signal; and a wavelength controlling unit configured to control the wavelength-tunable optical transmitting unit based on the extracted wavelength control signal and thereby determine the wavelength of the second optical signal.

An optical communication apparatus according to the present invention includes an optical receiving unit configured to receive a first optical signal; an optical wavelength detecting unit configured to detect a wavelength of the received first optical signal; a wavelength-tunable optical transmitting unit configured to transmit a second optical signal, changing a wavelength of the second optical signal; and a wavelength controlling unit configured to control the wavelength-tunable optical transmitting unit based on the detected wavelength and thereby determine the wavelength of the second optical signal.

An optical communication apparatus according to the present invention includes a wavelength control signal generating unit configured to generate a wavelength control signal; a wavelength control signal inserting unit configured to inset the wavelength control signal in a main signal to generate a modified main signal; an optical transmitting unit configured to convert the modified main signal into a first optical signal and transmit the first optical signal; and an optical receiving unit configured to receives a second optical signal transmitted from another optical communication apparatus that receives the first optical signal. A wavelength of the second optical signal is determined based on the wavelength control signal contained in the transmitted first optical signal.

An optical communication method according to the present invention includes inserting a wavelength control signal in a main signal; converting the main signal in which the wavelength control signal is inserted into a first optical signal; transmitting the first optical signal; receiving the first optical signal; extracting the wavelength control signal from the received first optical signal; determining a wavelength of a second optical signal based on the extracted wavelength control signal; and transmitting the second optical signal.

An optical communication method according to the present invention comprising converting a main signal into a first optical signal; transmitting the first optical signal; receiving the first optical signal; detecting a wavelength of the received first optical signal; determining a wavelength of a second optical signal based on the wavelength of the detected wavelength control signal; and transmitting the second optical signal.

Accordingly, with the configuration and method as described above, the optical communication system of the present invention, as well as the optical communication apparatus and the optical communication method used for the system respectively produces an effect that a wavelength of a second transmission signal can be set more easily and more efficiently, by determining the wavelength of the second transmission signal according to a received first transmission signal.

BRIEF DESCRIPTION OF THE DRAWINGS

Various aspects, features and advantages of the present invention will become more apparent from the following detailed description of preferred embodiments when taken in conjunction with the accompanying drawings wherein:

FIG. 5 shows an example of a table of correspondence between wavelength control signals and wavelengths of transmission signals;

FIG. 7 is an example of a table of correspondence between wavelengths of received signals and wavelengths of transmission signals.

DETAILED DESCRIPTION OF PREFERRED EMBODIMENTS

Figure 1:
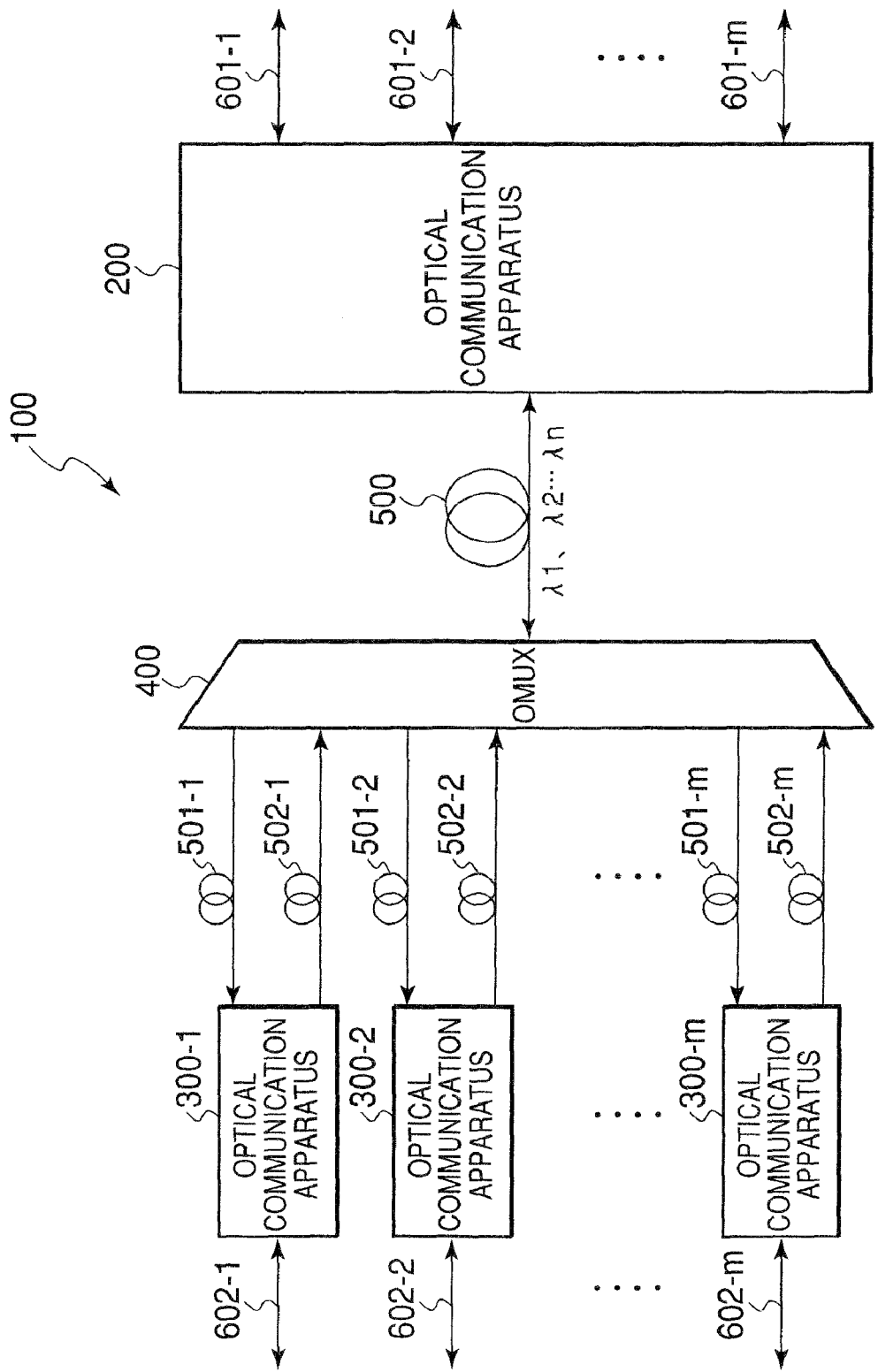
FIG. 1 shows a schematic configuration of an optical communication system according to a first embodiment of the present invention.

A first embodiment of the present invention will now be described. A description will be made for an example in which a wavelength division multiplexing (WDM) optical communication is performed when the number of wavelengths is n (n=an integer of 2 or more) with reference to FIG. 1. An optical communication system 100 according to the first embodiment of the present invention includes a master side optical communication apparatus 200; plural slave side optical communication apparatuses 300-1 to 300-m (m=½ of n); an optical wavelength division multiplexer (hereinafter called optical multiplexer) 400, and an optical transmission line 500. The optical communication system 100 also includes plural slave side optical transmission lines 501-1 to 501-m and 502-1 to 502-m for connecting the plurality of optical communication apparatuses 300-1 to 300-m to the optical multiplexer 400. The optical transmission line 500 is demultiplexed into plural optical transmission lines 501-1 to 501-m and 502-1 to 502-m through the optical multiplexer 400. Each port for connection of the optical multiplexer 400 is limited by an input/output-enabled wavelength. Consequently, each of the optical transmission lines 501-1 to 501-m and 502-1 to 502-m connected to the respective ports of the optical multiplexer 400 receives only an optical signal having its specific wavelength.

The optical communication apparatus 200 is connected to the optical transmission line 500 at one side and to plural master side external communication lines 601-1 to 601-m at the other side. Each of the optical communication apparatuses 300-1 to 300-m is connected to one of the optical transmission lines 501-1 to 501-m and one of the optical transmission lines 502-1 to 502-m at one side and to one of slave side external communication lines 602-1 to 602-m at the other side. The optical communication apparatus 200 exchanges data externally through the external communication lines 601-1 to 601-m. Each of the optical communication apparatuses 300-1 to 300-m exchanges data externally through the external communication lines 602-1 to 602-m.

The detailed configurations of the first embodiment will now be described with reference to FIGS. 2 to 4. At first, the optical communication apparatus 200 includes a wavelength control signal generating unit 201-1; a wavelength control signal inserting unit 202-1; a wavelength-locked optical transmitting unit 203-1; and an optical receiving unit 204-1. A similar configuration is also realized with each of wavelength control signal generating units 201-2 to 201-m; each of wavelength control signal inserting units 202-2 to 202-m; each of wavelength-locked optical transmitting units 203-2 to 203-m; and each of optical receiving units 204-2 to 204-m. The optical communication apparatus 200 also includes an optical wavelength division multiplexing unit (hereinafter called optical MUX unit) 210. The optical MUX unit 210 connects each of the wavelength-locked optical transmitting units 203-1 to 203-m; or each of the optical receiving units 204-1 to 204-m to one of the ports at the demultiplexing side. The optical MUX unit 210 connects the optical transmission line 500 at the multiplexing side. Each port for connection of the optical MUX unit 210 is limited by an input/output-enable wavelength. Consequently, each of the wavelength-locked optical transmitting units 203-1 to 203-m connected to one of the ports of the optical MUX unit 210 transmits an optical signal having its specific wavelength. Each of the optical receiving units 204-1 to 204-m connected to one of the ports of the optical MUX unit 210 receives only an optical signal having a specific wavelength.

Hereunder, a description will be made for a configuration of a representative one of similar configurations described above with use of the wavelength control signal generating unit 201-1; the wavelength control signal inserting unit 202-1; the optical wavelength-locked optical transmitting unit 203-1; and the optical receiving unit 204-1. The wavelength control signal generating unit 201-1 generates a wavelength control signal 1 to control a wavelength of an optical signal transmitted by an optical communication apparatus of a control target. The wavelength control signal inserting unit 202-1 inserts the wavelength control signal 1 in a main signal 1 containing data signals. The wavelength-locked optical transmitting unit 203-1 converts the main signal 1 containing the wavelength control signal 1 to an optical signal 1 having a wavelength $\lambda 1$, and then transmits the optical signal 1. The optical MUX unit 210 multiplexes the optical signal 1 having the wavelength $\lambda 1$ transmitted from the wavelength-locked optical transmitting unit 203-1 with an optical signal having another wavelength, and outputs the multiplexed signal to the optical transmission line 500. On the other hand, the optical MUX unit 210 demultiplexes the wavelength division multiplexed (WDM) optical signal inputted from the optical transmission line 500. After that, the optical receiving unit 204-1 receives an optical signal 2 having a wavelength $\lambda 2$, which is one of the demultiplexed optical signals, and then converts the received optical signal to a main signal 2 so as to be processed in the optical communication apparatus 200. Similarly, the optical wavelength-locked optical transmitting unit 203-2 converts a main signal 3 containing the wavelength control signal 2 to an optical signal 3 having a wavelength $\lambda 3$, and then transmits the optical signal 3 to the optical MUX unit 210. On the other hand, the optical receiving unit 204-2 receives an optical signal 4 having a wavelength $\lambda 4$, which is one of the optical signals demultiplexed by the optical MUX unit 210, and then converts the optical signal 4 to a main signal 4.

Figure 3:
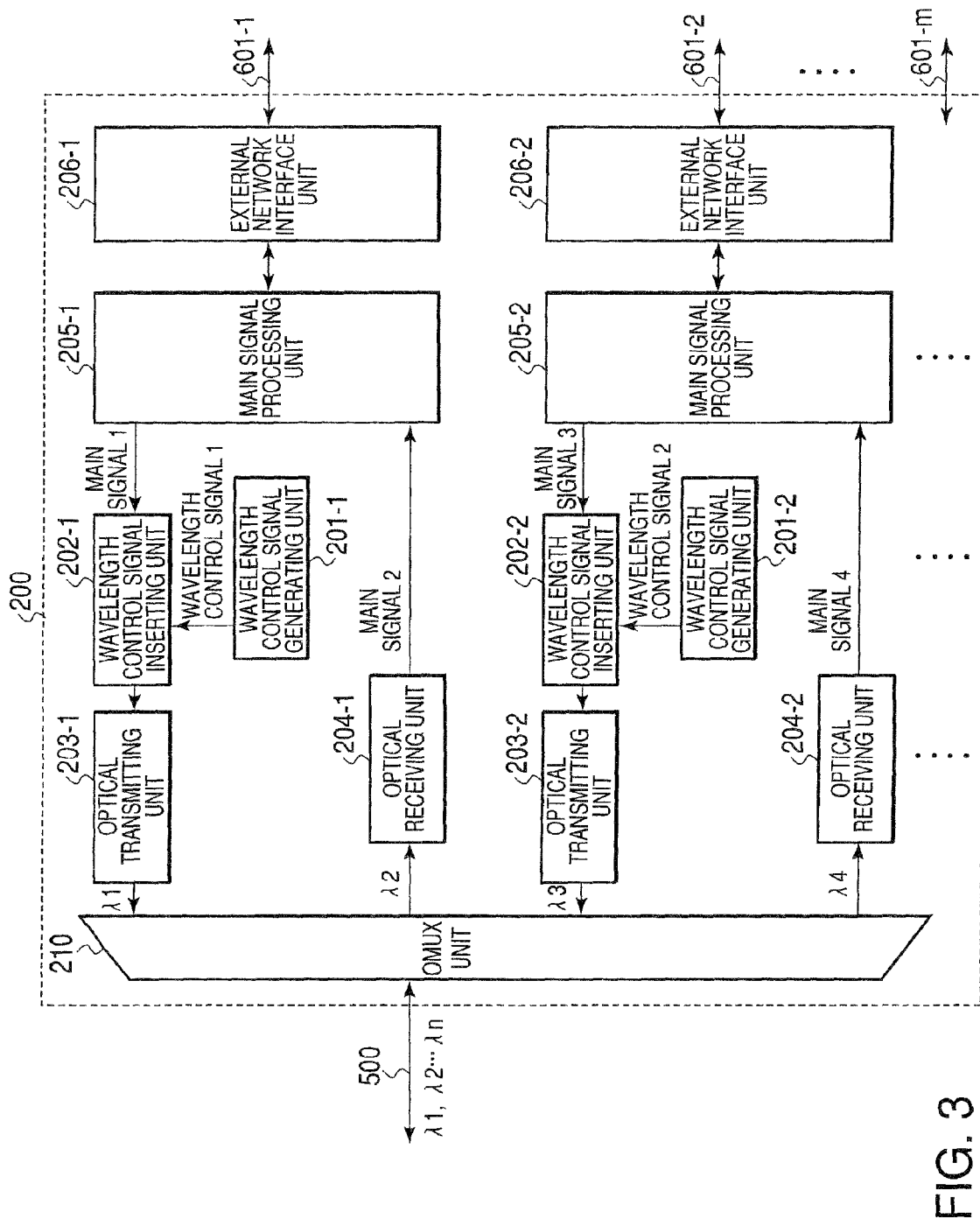
FIG. 3 shows a detailed configuration of a master side optical communication apparatus.

The optical communication apparatus 200, as shown in FIG. 3, may include main signal processing units 205-1 to 205-m and external network interface units 206-1 to 206-m. Each of the main signal processing units 205-1 to 205-m executes a processing in an upper layer according to the type of the optical communication apparatus 200. Each of the main signal processing units 205-1 to 205-m processes each main signal to be transmitted to each of wavelength control signal inserting units 202-1 to 202-m and each main signal received from each of optical receiving units 204-1 to 204-m. Each of the external network interface units 206-1 to 206-m converts the formats of signals exchanged mutually between each of the external communication lines 601-1 to 601-m and each of the main signal processing units 205-1 to 205-m.

Next, the slave side optical communication apparatus 300-1 to 300-m will now be described with reference to FIGS. 2 and 4. The optical communication apparatuses 300-1 to 300-m each have a similar configuration. Therefore, only the optical communication apparatus 300-1 will be described here as a representative one of those apparatuses. The optical communication apparatus 300-1 includes an optical receiving unit 301-1; a wavelength control signal detecting unit 302-1; a wavelength control signal processing unit 303-1; a wavelength controlling unit 304-1; and a wavelength-variable optical transmitting unit 305-1. An optical multiplexer 400 is provided between the optical receiving units 301-1 to 300-m and the optical transmission line 500. Each of the optical communication apparatuses 300-1 to 300-m is connected to a port at the demultiplexing side of the optical multiplexer 400 through one of the optical transmission lines 501-1 to 501-m and one of the optical transmission lines 502-1 to 502-m. The optical multiplexer 400 connects the optical transmission line 500 to the multiplexing side. The optical multiplexer 400 demultiplexes a WDM optical signal transmitted through the optical transmission line 500 and thereby outputs optical signals having each wavelength to the optical transmission lines 501-1 to 501-m. On the other hand, the optical multiplexer 400 multiplexes optical signals having each wavelength transmitted through the optical transmission lines 502-1 to 502-m and thereby outputs the multiplexed signal to the optical transmission line 500 as a WDM optical signal. The optical transmission line 501-1 transmits an optical signal having a wavelength λ1 to the optical communication apparatus 300-1 while the optical transmission line 502-1 transmits an optical signal having a wavelength λ2 to the optical multiplexer 400.

The optical receiving unit 301-1 converts the optical signal having the wavelength λ1 inputted through the optical transmission line 501-1 to a signal formatted so as to be processed in the optical receiving unit 301-1. The wavelength control signal detecting unit 302-1 separates the main signal 1 and the wavelength control signal 1 from a signal received from the optical receiving unit 301-1. The wavelength control signal processing unit 303-1 analyzes the received wavelength control signal 1 to determine λ2 as a transmission wavelength of an optical signal used as a transmission signal. Then, the wavelength control signal processing unit 303-1 notifies the wavelength controlling unit 304-1 that the transmission wavelength is λ2. The wavelength controlling unit 304-1 controls the wavelength of a transmission signal of the wavelength-variable optical transmitting unit 305-1 so that it becomes λ2. The wavelength-variable optical transmitting unit 305-1 converts the main signal 2 to the optical signal 2 having the wavelength λ2 and thereby transmits the optical signal 2 to the optical transmission line 502-1.

Figure 4:
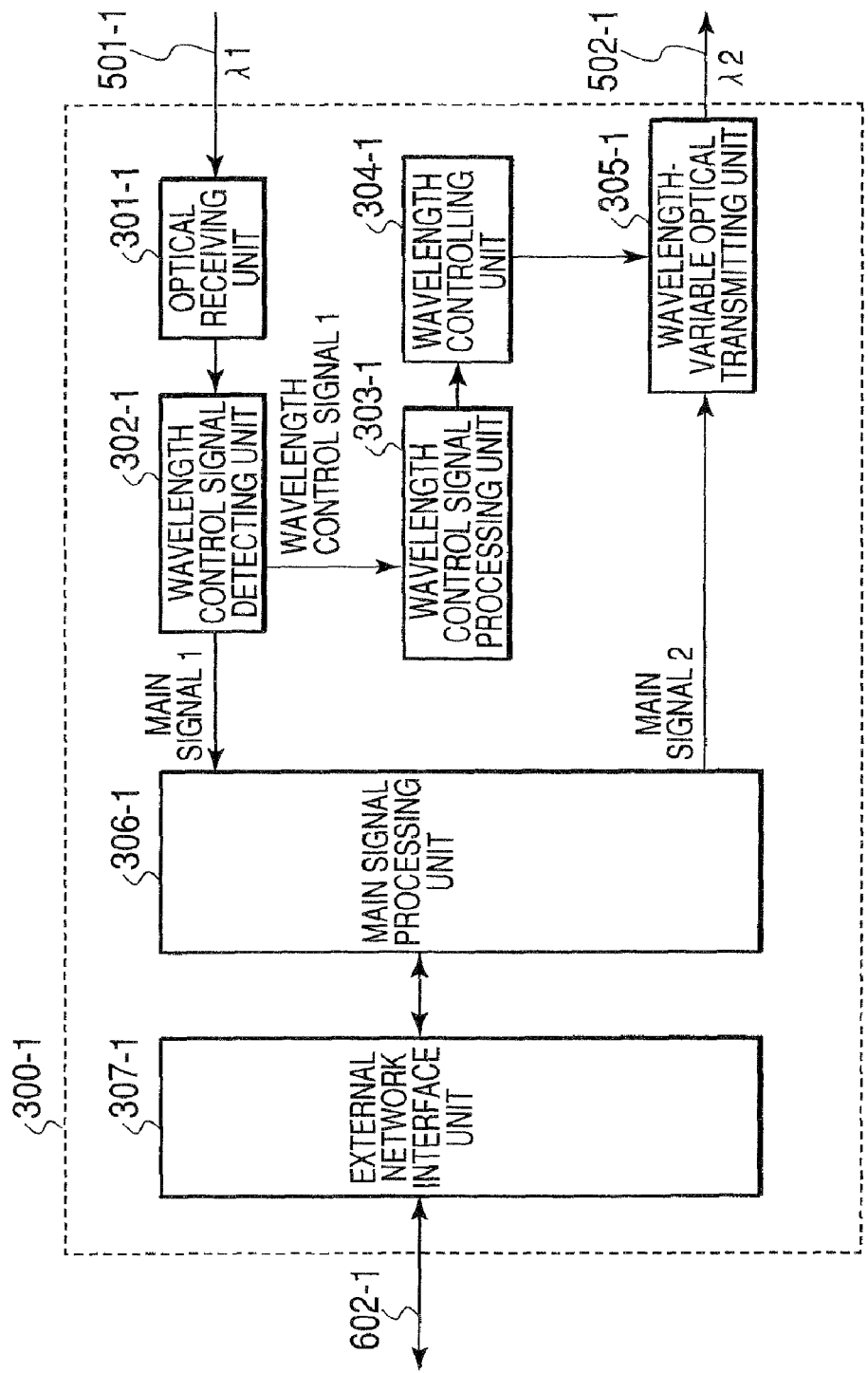
FIG. 4 shows a detailed configuration of a slave side optical communication apparatus.

The optical communication apparatus 301-1, as shown in FIG. 4, includes a main signal processing unit 306-1 and an external network interface unit 307-1. The main signal processing unit 306-1 makes a processing for the main signal 1 in an upper layer according to the type of the optical communication apparatus 300-1. The external network interface unit 307-1 converts the formats of the signals exchanged mutually between the external communication line 602-1 and the main signal processing unit 306-1.

Next, operation of the first embodiment will now be described. At first, the transmission processing of the master side optical communication apparatus 200 will be described with reference to FIGS. 1 and 3.

The optical communication apparatus 200 receives a signal 1 inputted through the external communication line 601-1 at the external network interface unit 206-1. The external network interface unit 206-1 converts the received signal 1 to a signal formatted so as to be processed in the optical communication apparatus 200 and transmits the converted signal to the main signal processing unit 205-1. The main signal processing unit 205-1 makes a processing for the received signal 1 in an upper layer according to the optical communication apparatus 200 and transmits the converted signal to the wavelength control signal inserting unit 202-1.

On the other hand, the wavelength control signal generating unit 201-1 generates a wavelength control signal 1 having wavelength information on the transmission wavelength λ1 to be transmitted from the wavelength-locked optical transmitting unit 203-1 and wavelength information on the reception wavelength λ2 received by the optical receiving unit 204-1, and then transmits the wavelength control signal 1 to the wavelength control signal inserting unit 202-1. The wavelength control signal inserting unit 202-1 superimposes the wavelength control signal 1 received from the wavelength control signal generating unit 201-1 on the main signal 1 received from the main signal processing unit 205-1 and transmits the modified signal to the wavelength-locked optical transmitting unit 203-1. The wavelength-locked optical transmitting unit 203-1 converts the modified signal received from the wavelength control signal inserting unit 202-1 to an optical signal 1 having the wavelength λ1 and transmits the optical signal 1 to the optical MUX unit 210. The optical MUX unit 210 then multiplexes the optical signal 1 having the wavelength λ1 and the optical signals having other wavelengths λ3, λ5, λ7, etc. received from other wavelength-locked optical transmitting units 203-2 to 203-m. Then, the optical MUX unit 210 outputs the WDM optical signal 1 to the optical transmission line 500.

The optical transmission line 500 transmits the WDM optical signal 1 output from the optical MUX unit 210 to the optical multiplexer 400. The optical multiplexer 400 demultiplexes the inputted WDM optical signal 1 and outputs the demultiplexed optical signals having each wavelength to the optical transmission lines 501-1 to 501-m respectively. For example, the optical multiplexer 400 outputs the optical signal 1 having the wavelength λ1 to the optical transmission line 501-1 and the optical signal 3 having the wavelength λ3 to the optical transmission line 501-2.

Next, operation of the slave side optical communication apparatus will be described with reference to FIGS. 1 and 4.

The optical communication apparatus 300-1 receives the optical signal having the wavelength λ1 transmitted through the optical transmission line 501-1 at the optical receiving unit 301-1. The optical receiving unit 301-1 then converts the received optical signal 1 having the wavelength λ1 to a signal formatted so as to be processed in the optical communication apparatus 300-1, and then transmits the converted signal to the wavelength control signal detecting unit 302-1. The wavelength control signal detecting unit 302-1 demultiplexes the received signal into the main signal 1 and the wavelength control signal 1. Then, the wavelength control signal detecting unit 302-1 transmits the main signal 1 to the main signal processing unit 306-1 and the wavelength control signal 1 to the wavelength control signal processing unit 303-1 respectively.

The main signal 1 received by the main signal processing unit 306-1 is processed in an upper layer according to the optical communication apparatus 300-1. The main signal processing unit 306-1 transmits the processed signal to the external network interface unit 307-1. Then, the external network interface unit 307-1 converts the received signal to a signal formatted appropriately to the external communication line 602-1 and outputs the formatted signal.

On the other hand, the wavelength control signal 1 received by the wavelength control signal processing unit 303-1 is analyzed there. And according to the analysis result, the wavelength control signal processing unit 303-1 determines λ2 as the wavelength of the optical signal to be transmitted therefrom. Then, the wavelength control signal processing unit 303-1 notifies the wavelength controlling unit 304-1 of the information. The wavelength controlling unit 304-1 controls the transmission wavelength of the optical signal transmitted from the wavelength-variable optical transmitting unit 305-1 so that it becomes λ2, according to the information received from the wavelength control signal processing unit 303-1.

The optical communication apparatus 300-1 receives the signal 2 inputted from the external communication line 602-1 at the external network interface unit 307-1. The external network interface unit 307-1 converts the received signal 2 to a signal formatted so as to be processed in the optical communication apparatus 300-1 and transmits the converted signal to the main signal processing unit 306-1. The main signal processing unit 306-1 processes the received signal 2 in an upper layer according to the optical communication apparatus 300-1 and transmits the processed signal to the wavelength-variable optical transmitting unit 305-1 as a main signal 2. The wavelength-variable optical transmitting unit 305-1 converts the main signal 2 received from the main signal processing unit 306-1 to an optical signal 2 having a wavelength λ2 according to the information received from the wavelength controlling unit 304-1 and transmits the optical signal 2 to the optical transmission lines 502-1.

Next, a description will be made for how a slave side optical communication apparatus transmits an optical signal with reference to FIG. 1 again.

The optical signal 2 having the wavelength λ2, as well as the optical signals having other wavelengths λ4, λ6, λn output to other optical communication apparatuses 502-1 to 502-*m* are transmitted through their corresponding optical transmission lines respectively and output to the optical multiplexer 400 respectively. The optical multiplexer 400 multiplexes for the received optical signals having wavelengths λ2, λ4, λ6, ... λn there. Then, the optical multiplexer 400 outputs the WDM optical signal 2 to the optical transmission line 500. The optical transmission line 500 transmits the WDM optical signal 2 output from the optical multiplexer 400 in the opposite direction of the WDM optical signal 1 so as to be output to the optical communication apparatus 200.

Finally, a description will be made for how the master side optical communication apparatus receives signals with reference to FIG. 3 again.

The optical communication apparatus 200 receives the WDM optical signal 2 inputted from the optical transmission line 500 at the optical MUX unit 210. The optical MUX unit 210 demultiplexes the WDM optical signal 2 and outputs an optical signal 2 having a wavelength λ2 to the optical receiving unit 204-1. Then, the optical receiving unit 204-1 converts the received optical signal 2 having the wavelength λ2 to a main signal 2 formatted so as to be processed in the optical communication apparatus 200. The optical receiving unit 204-1 then transmits the main signal 2 to the main signal processing unit 205-1. The main signal processing unit 205-1 processes the received main signal 2 in an upper layer according to the optical communication apparatus 200 and transmits the processed signal to the external network interface unit 206-1. The external network interface unit 206-1 converts the received signal to a signal formatted appropriately to the external communication line 601-1 and outputs the formatted signal.

As described above, the optical communication system 100 according to the first embodiment can determine a wavelength of an optical signal to be transmitted from the optical communication apparatus 300-1 to the optical communication apparatus 200 with use of the wavelength control signal 1 generated in the optical communication apparatus 200. The optical communication system 100 can also determine the transmission wavelength of each of the other optical communication apparatuses 300-2 to 300-*m* similarly with use of the wavelength control signals 2 to m transmitted from the optical communication apparatus 200.

Each of the wavelength control signal processing units 303-1 to 303-*m* provided in the optical communication apparatuses 300-1 to 300-*m* has information related to each port of the optical multiplexer 400 used in the system and information related to each input/output-enabled wavelength beforehand. Consequently, a wavelength usable in each slave side optical communication apparatus can be determined according to the wavelength control information embedded in each wavelength control signal transmitted from the optical communication apparatus 200. As a result, each slave side optical communication apparatus can determine a wavelength according to a position at which the slave side optical communication apparatus is connected to the optical multiplexer 400.

FIG. 5 shows an example of a table of correspondence between wavelength control signals generated in the master side optical communication apparatus and wavelengths of transmission signals transmitted from each slave side optical communication apparatus. Each of the master side optical communication apparatus and the slave side optical communication apparatus has a relationship between the wavelength control signals and the wavelengths of the transmission signals set beforehand as shown in FIG. 5. Consequently, the master side optical communication apparatus embeds beforehand wavelength information used by each slave side optical communication apparatus in each wavelength control signal. Each slave side optical communication apparatus determines a transmission wavelength of each optical signal to be transmitted therefrom according to the wavelength information obtained from the wavelength control signal. For example, upon receiving a wavelength control signal 1, the slave side optical communication apparatus determines the wavelength of the transmission signal as λ2 according to the wavelength information embedded in the wavelength control signal 1. Similarly, upon receiving a wavelength control signal 2, the slave side optical communication apparatus determines the wavelength of the transmission signal as λ4.

As described above, the first embodiment has an effect that a transmission wavelength of an optical signal transmitted from an optical communication apparatus can be set more easily and more efficiently by determining the transmission wavelength with use of a wavelength control signal received from the optical communication apparatus connected to the opposite side.

Furthermore, the first embodiment also has another effect that no leased line for transmitting the wavelength control signal is needed, since the wavelength control signal is inserted in a main signal to produce a modified main signal and the modified main signal is transmitted.

Furthermore, the first embodiment also has still another effect that a transmission wavelength of each newly installed slave side optical communication apparatus can be set regardless of the system operation status. That is because a system of the master side optical communication apparatus and each slave side optical communication apparatus is set up for each wavelength independently. Consequently, even while the slave side optical communication apparatus 300-2 (that uses λ3 and λ4) is operating, the transmission wavelength of the slave side optical communication apparatus 300-1 (that uses λ1 and λ2) can be set in this first embodiment.

Furthermore, the first embodiment has still another effect that the transmission wavelengths of the respective slave side optical communication apparatuses can be set simultaneously from the master side optical communication apparatus. Consequently, the first embodiment also has still another effect that each transmission wavelength can be set quickly. That is because the respective wavelength control signal generating units provided in the master side optical communication apparatus can transmit their wavelength control signals individually to the slave side optical communication apparatuses simultaneously and those wavelength control signals are superimposed on optical signals having different wavelengths respectively.

Figure 6:
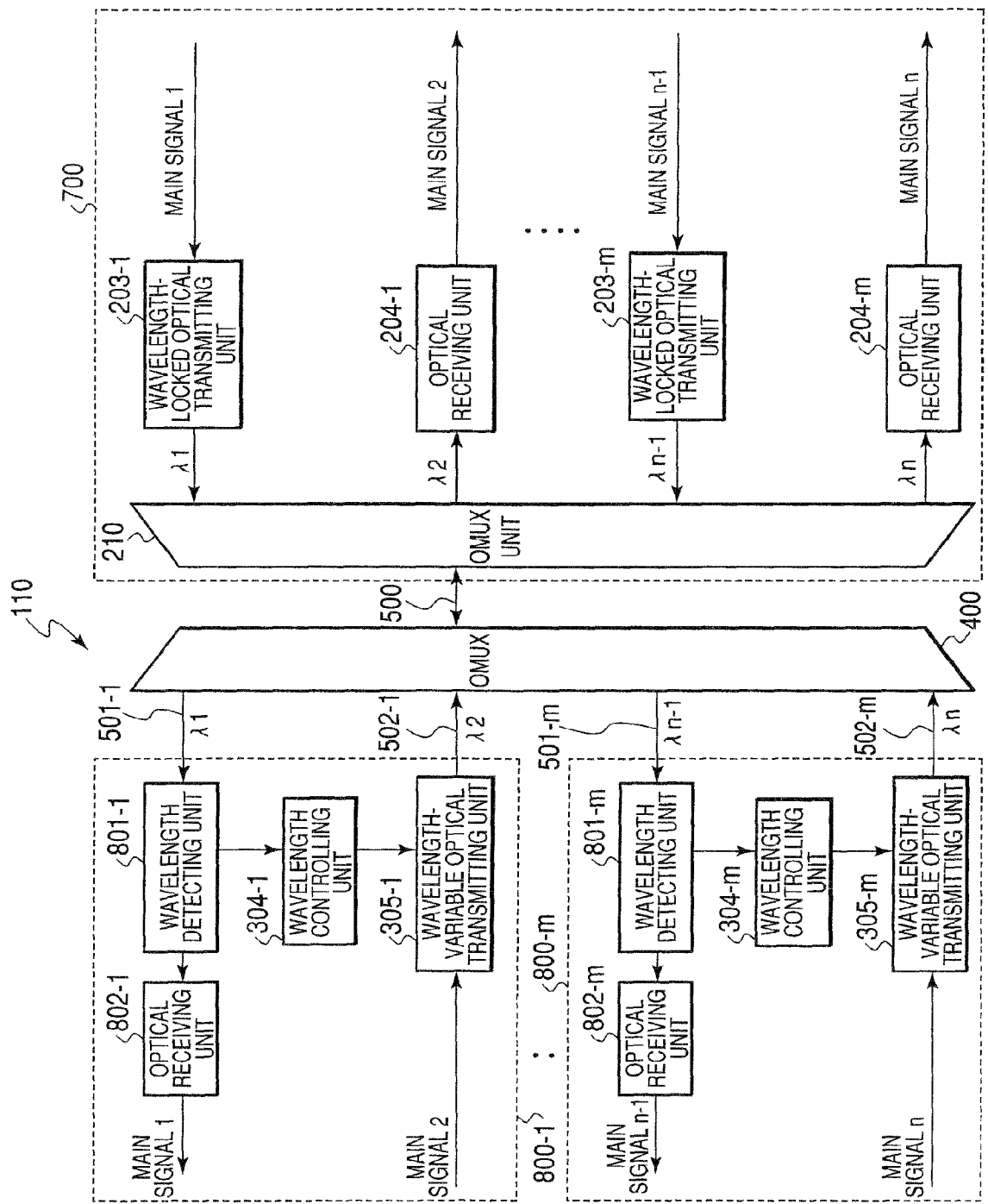
FIG. 6 shows a schematic configuration of an optical communication system according to a second embodiment of the present invention.

A second embodiment of the present invention will now be described with reference to FIG. 6. An optical communication system 110 according to the second embodiment includes a master side optical communication apparatus 700; plural slave side optical communication apparatuses 800-1 to 800-$m$; an optical multiplexer 400; an optical transmission line 500; and plural slave side optical transmission lines 501-1 to 501-$m$ and 502-1 to 502-$m$. Here, the same reference numerals will represent the same components as those in the first embodiment, avoiding redundant description.

The optical communication system 110 of the second embodiment is structured so that each slave side optical communication apparatus detects a wavelength of an optical signal transmitted from the master side optical communication apparatus. Consequently, each of the slave side optical communication apparatus determines a wavelength of an optical signal to be transmitted therefrom.

Figure 2:
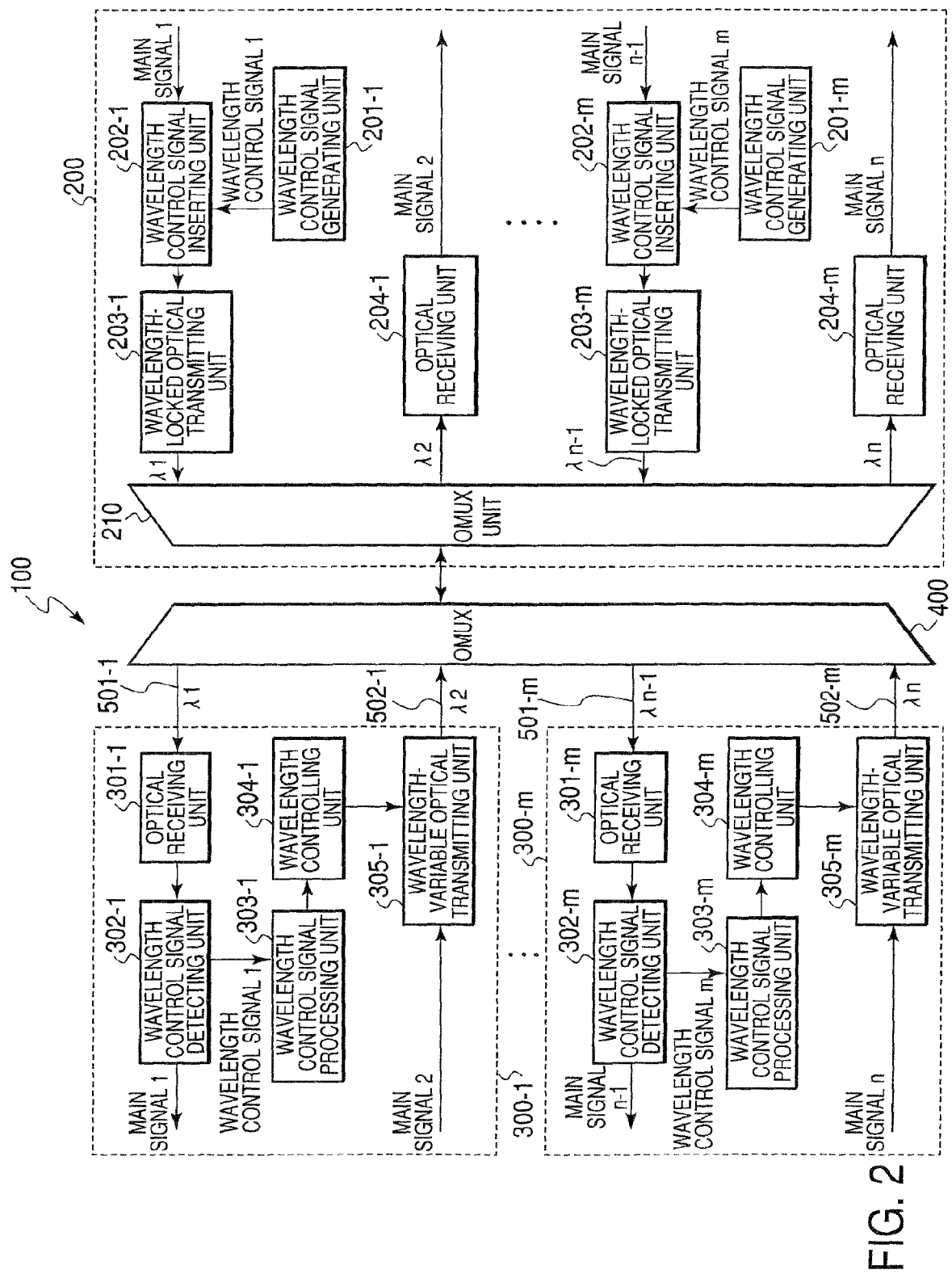
FIG. 2 shows a detailed configuration of the optical communication system according to the first embodiment of the present invention.

The optical communication apparatus 700 does not include the wavelength control signal generating units 201-1 to 201-$m$ and the wavelength control signal inserting units 202-1 to 202-$m$ shown in FIG. 2 of the first embodiment. The optical communication apparatus 700 includes plural wavelength-locked optical transmitting units 203-1 to 203-$m$, plural optical receiving units 204-1 to 204-$m$, and an optical MUX unit 210. On the other hand, the optical communication apparatus 800-1 includes none of the optical receiving unit 301-1, the wavelength control signal detecting unit 302-1 and the wavelength control signal processing unit 303-1 shown in FIG. 2 of the first embodiment. Instead of those, the optical communication apparatus 800-1 includes an optical wavelength detecting unit 801-1 and an optical receiving unit 802-1 that are newly provided.

The optical wavelength detecting unit 801-1 detects a wavelength of an optical signal received from the optical transmission line 501-1. In the case shown in FIG. 6, the optical wavelength detecting unit 801-1 detects the wavelength $\lambda 1$ and transmits the wavelength $\lambda 1$ information to the wavelength controlling unit 304-1. The wavelength controlling unit 304-1 determines $\lambda 2$ as the transmission wavelength of the optical signal transmitted from the optical communication apparatus 800-1 according to the information of the received wavelength $\lambda 1$. And according to the determination, the wavelength controlling unit 304-1 controls the wavelength of the optical signal transmitted form the wavelength-variable optical transmitting unit 305-1 so that it becomes $\lambda 2$.

Next, a description will be made for the operation of the second embodiment. The optical signal 1 having the wavelength $\lambda 1$ transmitted from the wavelength-locked optical transmitting unit 203-1 of the optical communication apparatus 700 is multiplexed with other optical signals having other wavelengths in the optical MUX unit 210, and then transmitted to the optical communication apparatus 800-1 similar to the first embodiment. The optical communication apparatus 800-1 receives the optical signal 1 having the wavelength $\lambda 1$ at the optical wavelength detecting unit 801-1. The optical wavelength detecting unit 801-1 detects the wavelength $\lambda 1$ from the received optical signal 1 and transmits the wavelength $\lambda 1$ information to the wavelength controlling unit 304-1. Because the received wavelength is $\lambda 1$, the wavelength controlling unit 304-1 determines $\lambda 2$ as the wavelength of the optical signal transmitted from the optical communication apparatus 800-1 with reference to a table of correspondence between received wavelengths and transmission wavelengths set beforehand in the optical communication apparatus 800-1. And according to the determination, the wavelength controlling unit 304-1 controls the wavelength of the optical signal transmitted from the wavelength-variable optical transmitting unit 305-1 so that it becomes $\lambda 2$. The wavelength-variable optical transmitting unit 305-1 then converts the received main signal 2 to an optical signal 2 having the wavelength $\lambda 2$ and outputs the optical signal 2 to the optical transmission lines 502-1.

As described above, the optical communication system 110 in the second embodiment determines a wavelength of an optical signal transmitted from each slave side optical communication apparatus according to the wavelength of each optical signal received from the master side optical communication apparatus.

Each of the wavelength controlling units 304-1 to 304-$m$ provided in each of the optical communication apparatuses 800-1 to 800-$m$ stores information regarding each port of the optical multiplexer 400 used by the system and each wavelength input/output-enabled thereto beforehand. Consequently, each of the slave side optical communication apparatus can determine its usable wavelength according to the wavelength of its received optical signal. As a result, each of the slave side optical communication apparatus can determine a wavelength according to a position connected to the optical multiplexer 400.

FIG. 7 shows an example of a table of correspondence between wavelengths of signals received by the slave side optical communication apparatuses and wavelengths of signals to be transmitted therefrom. Each of the slave side optical communication apparatus has a relationship between wavelengths of received signals and wavelengths of transmission signals set beforehand as shown in FIG. 7. Thus the slave side optical communication apparatus determines a wavelength of a transmission optical signal from a wavelength of a received optical signal. For example, when receiving an optical signal having $\lambda 1$, the slave side optical communication apparatus determines $\lambda 2$ as the wavelength of the transmission optical signal. Similarly, when receiving an optical signal having $\lambda 3$, the slave side optical communication apparatus determines $\lambda 4$ as the wavelength of the transmission optical signal.

As mentioned above, the second embodiment, in addition to the same effects as those in the first embodiment, also comes to have another effect that no special signal such as a wavelength control signal is required, since a transmission wavelength corresponding to each received wavelength is set beforehand. Consequently, this second embodiment can set a wavelength of an optical signal to be transmitted from each slave side optical communication apparatus in a configuration simpler than that in the first embodiment.

Because no special signal is used in the second embodiment, the second embodiment also has an effect that no leased line is required.

Figure 8:
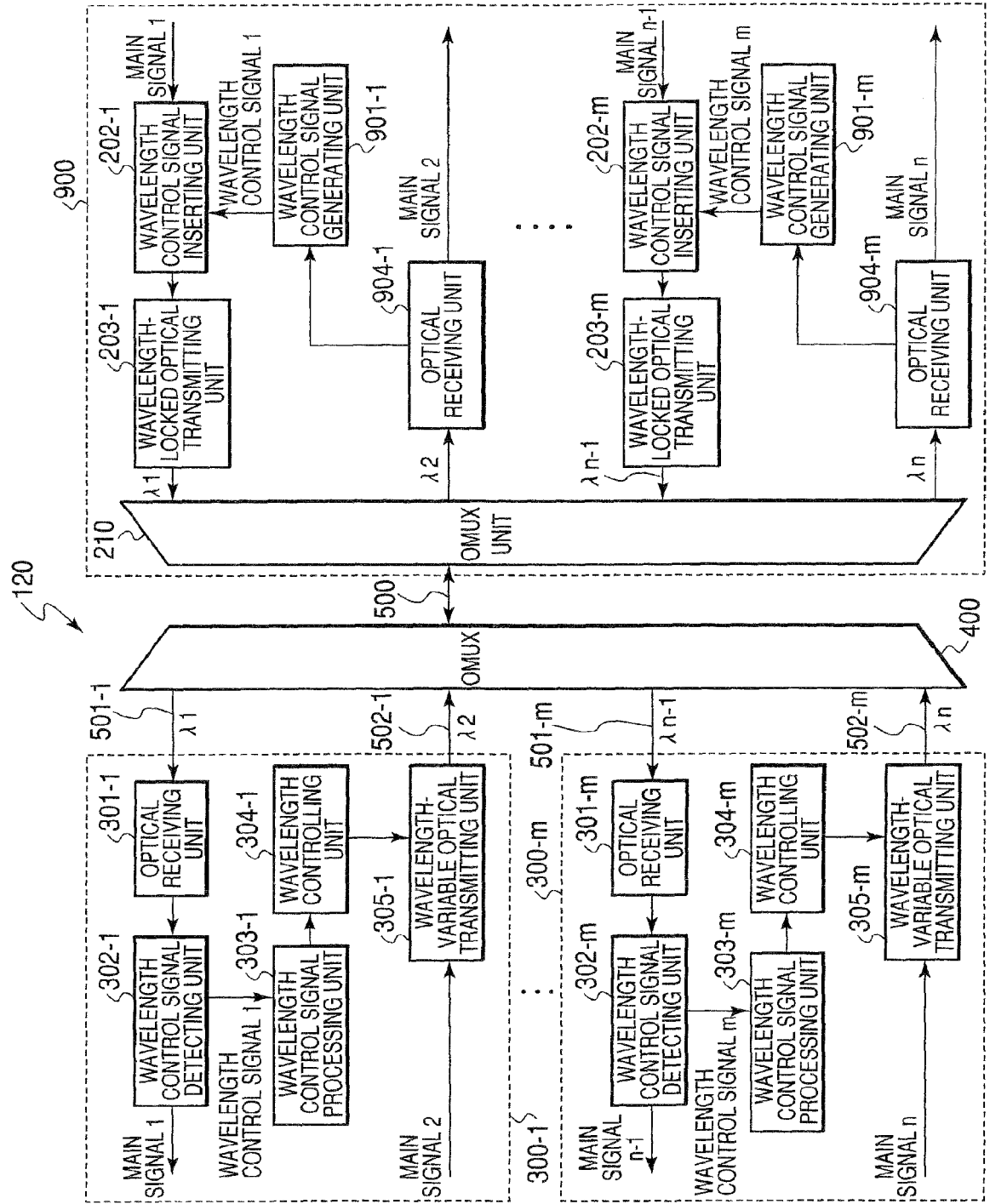
FIG. 8 is a schematic configuration of an optical communication system according to a third embodiment of the present invention.

A third embodiment of the present invention will now be described with reference to FIG. 8. The optical communication system 120 according to the third embodiment includes a master side optical communication apparatus 900; plural slave side optical communication apparatuses 300-1 to 300-

$m$; an optical multiplexer 400; an optical transmission line 500; and plural slave side optical transmission lines 501-1 to 501-$m$ and 502-1 to 502-$m$. In this third embodiment, the same reference numerals will represent the same components as those in the first embodiment, avoiding redundant description.

In addition to the configuration of the first embodiment, in the optical communication system 120 of this third embodiment, the master side optical communication apparatus monitors whether the plural slave side optical communication apparatus receive any optical signal or not. Consequently, the master side optical communication apparatus controls generation of wavelength control signals, and thereby controls each of wavelengths of optical signals that the plural slave side optical communication apparatus transmit.

The optical communication apparatus 900 substitutes the optical receiving unit 204-1 and the wavelength control signal generating unit 201-1 shown in FIG. 2 of the first embodiment for an optical receiving unit 904-1 and a wavelength control signal generating unit 901-1 respectively. The optical receiving unit 904-1 has a function for detecting whether an optical signal is received or not. The optical receiving unit 904-1 transmits the information of the detection result to the wavelength control signal generating unit 901-1. Receiving the information, the wavelength control signal generating unit 901-1 controls generation of wavelength control signals.

Next, a description will be made for the operation of the optical communication system according to the third embodiment.

The optical receiving unit 904-1 detects whether an optical signal demultiplexed by the optical MUX unit 210 is received or not. The optical receiving unit 904-1 transmits the information of the detection result to the wavelength control signal generating unit 901-1. If the optical receiving unit 904-1 has not received an optical signal yet when receiving the information, the wavelength control signal generating unit 901-1 generates a wavelength control signal including a transmission wavelength of a subject slave side optical communication apparatus while changing the wavelength of the wavelength control signal sequentially. If the optical receiving unit 904-1 has received the optical signal, the wavelength control signal generating unit 901-1 confirms that a correct transmission wavelength is set for the subject slave side optical communication apparatus, and then keeps the wavelength control signal.

For example, when an optical signal having the wavelength $\lambda 2$ is not transmitted from the optical communication apparatus 300-1, the optical receiving unit 904-1 receives no optical signal. Consequently, the optical receiving unit 904-1 transmits information denoting "no optical signal received" to the wavelength control signal generating unit 901-1. Thus the wavelength control signal generating unit 901-1 generates the wavelength control signal 1 so that the wavelength of an optical signal transmitted from the optical communication apparatus 300-1 becomes $\lambda 2$. The optical communication apparatus 900 transmits the wavelength control signal 1 together with the main signal 1 to the optical communication apparatus 300-1. Then, the optical communication apparatus 300-1 converts the main signal 2 to an optical signal having the wavelength $\lambda 2$ according to the wavelength control signal 1 just like the processing in the first embodiment. The optical signal 2 is transmitted from the optical communication apparatus 300-1 to the optical communication apparatus 900 through the optical transmission line 500. Thus the optical signal 2 is demultiplexed by the optical MUX unit 210, and then received by the optical receiving unit 904-1 as an optical signal 2 having the wavelength $\lambda 2$. The optical receiving unit 904-1 transmits the information denoting "the optical signal 2 having the wavelength $\lambda 2$ received" to the wavelength control signal generating unit 901-1. The wavelength control signal generating unit 901-1 continues generation of the wavelength control signal 1. Consequently, the wavelength of the optical signal transmitted from the optical communication apparatus 300-1 is fixed at $\lambda 2$. In such a way, each of other optical communication apparatuses 300-2 to 300-$m$ controls the generation of a wavelength control signal according to the information received by each of the optical receiving units 904-2 to 904-$m$ through the similar operation to change the transmission wavelengths sequentially. Consequently, a transmission wavelength is set for each slave side optical communication apparatus so as to correspond to a position at which the subject slave side optical communication apparatus is connected to the optical wavelength division multiplexer (optical MUX 400).

As described above, the optical communication system in this third embodiment determines a wavelength of an optical signal to be transmitted from each slave side optical communication apparatus according to the information of the optical signal received by the master side optical communication apparatus.

In addition to the same effects as those in the first embodiment, this third embodiment has also another effect that a transmission wavelength can be set more accurately, since information of a wavelength received actually by the master side optical communication apparatus is fed back to the control signal generating unit.

It should be noted that the above embodiments may be used in combination. For example, the second and third embodiments may be combined.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical communication system, comprising:
    a first optical communication apparatus configured to convert a main signal into a first optical signal; and transmit the first optical signal; and
    a second optical communication apparatus configured to receive the first optical signal; detect a wavelength of the received first optical signal; determine a wavelength of a second optical signal based on the detected wavelength; and transmit the second optical signal to said first optical communication apparatus,
    wherein the wavelength of the first optical signal is different from the wavelength of the second optical signal.

2. The optical communication system according to claim 1, wherein said first optical communication apparatus comprises:
    an optical transmitting unit that converts the main signal into the first optical signal and transmits the first optical signal; and
    a first optical receiving unit that receives the second optical signal.

3. The optical communication system according to claim 2, wherein said first optical communication apparatus comprises a plurality of first communication units, each including:
a said optical transmitting unit; and
a said first optical receiving unit.

4. The optical communication system according to claim 3, wherein wavelengths of the transmitted first optical signals are different from each other, and wavelengths of the received second optical signals are different from each other among said plurality of first communication units.

5. The optical communication system according to claim 4, further comprising:
a first wavelength division multiplexing unit that is connected to each one of said plurality of first communication units,
wherein said first wavelength division multiplexing unit multiplexes a plurality of the first optical signals having mutually different wavelengths to be received from said plurality of first communication units into a first wavelength division multiplexed optical signal; demultiplexes a second wavelength division multiplexed optical signal into a plurality of the second optical signals having mutually different wavelengths; and transmits each one of the demultiplexed plurality of the second optical signals to each one of said plurality of first communication units.

6. The optical communication system according to claim 1, wherein said second optical communication apparatus comprises:
a second optical receiving unit that receives the first optical signal;
an optical wavelength detecting unit that detects the wavelength of the received first optical signal;
a wavelength-tunable optical transmitting unit that transmits the second optical signal, changing the wavelength of the second optical signal; and
a wavelength controlling unit that controls said wavelength-tunable optical transmitting unit based on the detected wavelength and thereby determines the wavelength of the second optical signal.

7. The optical communication system according to claim 6, wherein said second optical communication apparatus comprises a plurality of second communication units, each including:
a said second optical receiving unit;
a said optical wavelength detecting unit;
a said wavelength-tunable optical transmitting unit; and
a said wavelength controlling unit.

8. The optical communication system according to claim 7, wherein wavelengths of the receiving first optical signals are different from each other, and wavelengths of the transmitted second optical signals are different from each other among said plurality of second communication units.

9. The optical communication system according to claim 8, further comprising:
a second wavelength division multiplexing unit that is connected to each one of said plurality of the second communication units, wherein said second wavelength division multiplexing unit multiplexes a plurality of the second optical signals having mutually different wavelengths to be received from said plurality of second communication units into a second wavelength division multiplexed optical signal; demultiplexes a first wavelength division multiplexed optical signal into a plurality of the first optical signals having mutually different wavelengths; and transmits each one of the demultiplexed plurality of the first optical signals to each one of said plurality of second communication units.

10. An optical communication system according to claim 1, wherein the second optical communication apparatus is configured to determine the wavelength of the second optical signal based on the received first optical signal by being constructed and arranged to look up in a table of correspondence the wavelength of the second optical signal that was predetermined for the corresponding wavelength of the first optical signal.

11. An optical communication apparatus, comprising:
an optical receiving unit configured to receive a first optical signal;
an optical wavelength detecting unit configured to detect a wavelength of the received first optical signal;
a wavelength-tunable optical transmitting unit configured to transmit a second optical signal, changing a wavelength of the second optical signal; and
a wavelength controlling unit configured to control said wavelength-tunable optical transmitting unit based on the detected wavelength and thereby determine the wavelength of the second optical signal,
wherein the wavelength of the first optical signal is different from the wavelength of the second optical signal.

12. The optical communication apparatus according to claim 11, comprising a plurality of second communication units, each including:
a said optical receiving unit;
a said optical wavelength detecting unit;
a said wavelength-tunable optical transmitting unit; and
a said wavelength controlling unit.

13. The optical communication apparatus according to claim 12, wherein wavelengths of the receiving first optical signals are different from each other, and wavelengths of the transmitted second optical signals are different from each other among said plurality of communication units.

14. The optical communication apparatus according to claim 13, further comprising:
a wavelength division multiplexing unit that is connected to each one of said plurality of the communication units,
wherein said wavelength division multiplexing unit multiplexes a plurality of the second optical signals having mutually different wavelengths to be received from said plurality of communication units into a second wavelength division multiplexed optical signal; demultiplexes a first wavelength division multiplexed optical signal into a plurality of the first optical signals having mutually different wavelengths; and
transmits each one of the demultiplexed plurality of the first optical signals to each one of said plurality of communication units.

15. An optical communication apparatus according to claim 11,
wherein the wavelength controlling unit is configured to control the wavelength-tunable optical transmitting unit based on the detected wavelength by being constructed and arranged to look up in a table of correspondence the wavelength of the second optical signal that was predetermined for the corresponding wavelength of the first optical signal.

16. An optical communication method, comprising
converting, at a first optical communication apparatus, a main signal into a first optical signal;
transmitting the first optical signal from the first optical communication apparatus;

receiving the first optical signal at a second optical communication apparatus;

detecting, by the second optical communication apparatus, a wavelength of the received first optical signal;

determining, by the second optical communication apparatus, a wavelength of a second optical signal based on the wavelength of the first optical signal; and transmitting the second optical signal from the second optical communication apparatus, wherein the wavelength of the first optical signal is different from the wavelength of the second optical signal.

17. The optical communication method according to claim 16, wherein the transmitting step comprises:

separately transmitting, within the first optical communication apparatus, a plurality of the first optical signals converted so as to have mutually different wavelengths;

multiplexing, within the first optical communication apparatus, the plurality of the first optical signals into a wavelength division multiplexed optical signal; and transmitting, from the first optical communication apparatus, the wavelength division multiplexed optical signal, wherein the receiving step comprises:

receiving, at an optical multiplexer, the wavelength division multiplexed optical signal;

demultiplexing, at the optical multiplexer, the wavelength division multiplexed optical signal into the plurality of the first optical signals having mutually different wavelengths; and separately receiving the plurality of the first optical signals at a plurality of second optical communication apparati, one of which being the second optical communication apparatus.

18. An optical communication method according to claim 16, wherein determining, by the second optical communication apparatus, the wavelength of the second optical signal based on the wavelength of the first optical signal includes looking up in a table of correspondence the wavelength of the second optical signal that was predetermined for the corresponding wavelength of the first optical signal.

* * * * *